United States Patent
Iwadachi

(10) Patent No.: US 6,286,750 B1
(45) Date of Patent: Sep. 11, 2001

(54) METHOD OF MANUFACTURING BERYLLIUM-COPPER ALLOY HOT ISOSTATIC PRESS (HIP) BONDED BODY AND HIP-BONDED BODY

(75) Inventor: Takaharu Iwadachi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/532,474

(22) Filed: Mar. 22, 2000

(30) Foreign Application Priority Data

Mar. 23, 1999 (JP) .................................................. 11-077657

(51) Int. Cl.⁷ ............................ B23K 20/18; B23K 20/00
(52) U.S. Cl. ......................... 228/118; 228/193; 228/195
(58) Field of Search .................................... 228/223, 221, 228/193, 195, 33, 41, 125, 118

(56) References Cited

U.S. PATENT DOCUMENTS

| 4,816,347 | * | 3/1989 | Rosenthal et al. | 428/615 |
| 4,830,933 | * | 5/1989 | Hodes et al. | 428/646 |
| 4,896,815 | * | 1/1990 | Rosenthal et al. | 228/120 |
| 4,957,823 | * | 9/1990 | Nicholson et al. | 428/663 |
| 5,024,368 | * | 6/1991 | Bottomley et al. | 228/118 |
| 5,260,137 | * | 11/1993 | Rosenthal et al. | 428/608 |
| 5,425,494 | * | 6/1995 | Rosenthal et al. | 228/124.5 |
| 5,820,721 | * | 10/1998 | Beane et al. | 156/276 |
| 5,901,336 | * | 5/1999 | Dombrowski | 419/6 |
| 5,972,521 | * | 10/1999 | Huskamp et al. | 428/547 |
| 6,085,965 | * | 7/2000 | Schwartz et al. | 228/190 |
| 6,164,524 | * | 12/2000 | Iwadachi | 228/193 |
| 6,176,418 | * | 1/2001 | Iwadachi | 228/193 |

* cited by examiner

Primary Examiner—Tom Dunn
Assistant Examiner—Zidia Pittman
(74) Attorney, Agent, or Firm—Burr & Brown

(57) ABSTRACT

A HIP-bonded body of a beryllium member and copper alloy member. Before subjecting the members to HIP processing, a diffusion inhibiting layer is deposited on the outer surface of the copper alloy member. A bond promoting layer of aluminum or aluminum alloy is then formed on the diffusion inhibiting layer. During the HIP bonding step, an insert composed of an aluminum-magnesium alloy is juxtaposed between the outer aluminum layer of the pre-treated copper alloy member and the beryllium member.

37 Claims, 3 Drawing Sheets

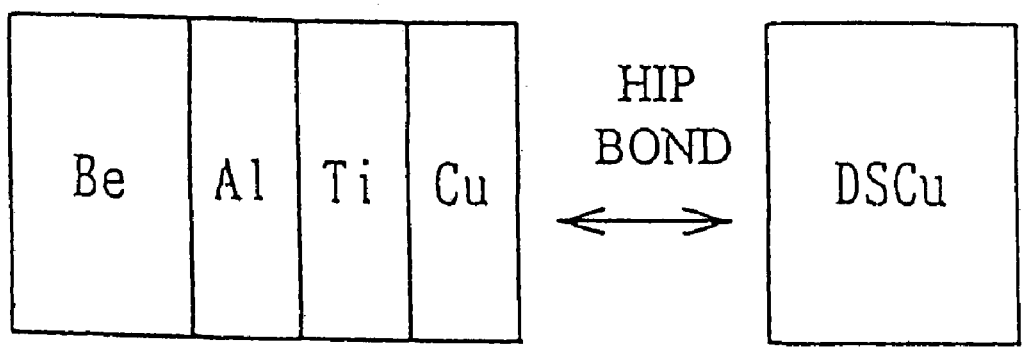
Fig. 1 - Prior Art

METHOD OF MANUFACTURING BERYLLIUM-COPPER ALLOY HOT ISOSTATIC PRESS (HIP) BONDED BODY AND HIP-BONDED BODY

BACKGROUND OF THE INVENTION

1. Field of the Invention

This invention relates in general to a method of producing hot isostatic press (HIP) bonded bodies. More specifically, but without restriction to the particular embodiment hereinafter described in accordance with the best mode of practice, this invention relates to HIP-bonded bodies comprised of a beryllium member and a copper alloy member as well as the method of manufacturing the beryllium-copper alloy HIP-bonded bodies.

2. Background of the Prior Art

Beryllium has recently attracted the attention of industry due to its remarkable neutron reflecting capabilities. Industrial applications involving neutron production and manipulation, such as material testing furnaces, electromagnetic energy reflectors and large scale neutron accelerators, take full advantage of this characteristic. Most of these applications, however, subject the beryllium to significant thermal loads. Although beryllium has excellent thermal conductivity properties, it is necessary to combine the beryllium with another compound to increase the beryllium's thermal conductivity. The most common compound used, alumina dispersion strengthened copper alloy ("DSCu"), is commonly bonded to the beryllium by hot isostatic pressing ("HIP").

Conventional HIP bonding of beryllium and copper alloy requires processing temperatures in excess of 700° C. to prevent the formation of an undesirable oxidation film on the surface of the beryllium member which can occur at temperatures below 700° C. The oxide film arrests the interdiffusion of the beryllium substrate and the copper alloy at temperatures not less than 700° C. In addition, brittle intermetallic precipitates, such as $Be_2Cu$ or BeCu form at the beryllium substrate copper alloy interface and degrade the strength of the bond. Moreover, the high temperatures required for traditional HIP bonding of beryllium-copper alloy bodies drive up production costs due to the extreme energy consumption demand.

The undesirable oxide film on the beryllium member can be removed in a vacuum atmosphere by ion plating and the like. Usually, a layer of pure copper is deposited on the beryllium surface to promote interdiffusion of the beryllium and copper alloy members. This method has resulted in HIP-bonded beryllium copper alloy bodies being formed at temperatures ranging from 400° C. to 550° C. However, when the bonded body formed by the aforementioned process is used in an application subject to temperatures greater than 400° C., brittle intermetallic compounds form at the beryllium-copper interface resulting in the aforementioned problem. It has also been discovered that incomplete copper diffusion occurs at temperatures below 600° C. due to the effects of the oxide film.

In an attempt to overcome the above-discussed problems, the present inventor proposed a process for bonding a beryllium member to a copper alloy member as shown in FIG. 1. This process is described in detail in U.S. patent application Ser. No. 09/243,664, now U.S. Pat. No. 6,164,524 the entirety of which is incorporated herein by reference. The process shown in FIG. 1 employs an aluminum layer formed on the beryllium member to act as a stress relaxation layer which accounts for the difference in coefficient of thermal expansion between the beryllium and copper alloy members. A diffusion inhibition layer such as Ti is then formed on the aluminum layer to suppress diffusion of beryllium and copper from their respective members, and thus suppress formation of the brittle intermetallic compounds discussed above. A bonding promotion layer such as Cu is then formed on the diffusion inhibition layer to enable the copper alloy (DSCu) member to be bonded to the Ti layer. The Be—Al—Ti—Cu subassembly is then HIP-bonded to the copper alloy member.

Although the process shown in FIG. 1 is a dramatic improvement over the prior art discussed above, it still produces a relatively low-strength joint between the beryllium and copper alloy members. Specifically, the HIP-bonding step needs to be performed at a temperature less than 600° C. in order to avoid melting the aluminum layer. The diffusivity of Cu at such a low temperature, however, is relatively low, and thus the joint between the Cu bonding promotion layer and the copper alloy member is relatively weak (albeit much stronger than the joints of the prior art discussed above).

It is therefore highly desirable to produce stronger beryllium-copper alloy HIP bonds by preventing the formation of oxide films and intermetallic brittle compounds that cause peeling during the HIP process while at the same time promoting complete copper diffusion of the copper alloy member.

SUMMARY OF THE INVENTION

The present invention serves to solve the above-mentioned problems with the prior art. It is therefore an object of the present invention to provide a novel HIP-bonded body comprised of a beryllium member and a copper alloy member, as well as a method for manufacturing the same, wherein the beryllium member and copper alloy member are subjected to HIP-bonding temperatures sufficient to allow for complete diffusion of the metals into the interface therebetween, thus resulting in bonds having improved strength over the prior art beryllium-copper alloy bonds. The present invention also prevents the formation of brittle intermetallic compounds during the bonding stage and during use, to thereby maintain a strong bond at the interface between the two members.

Based on the foregoing, one aspect of the present invention resides in a HIP-bonded body comprising a beryllium member, a copper alloy member and an aluminum-magnesium alloy or aluminum-silicon-magnesium alloy insert body juxtaposed between the beryllium member and the copper alloy member during HIP bonding. The copper alloy member includes on its interface surface a thin diffusion inhibiting layer composed of titanium, vanadium, niobium, chromium, molybdenum or silicon. Preferably, a bond promoting layer of aluminum or aluminum alloy is formed on the surface of the diffusion inhibiting layer.

More preferably, a copper or copper alloy layer is interposed between the copper alloy member and the diffusion inhibiting layer.

Most preferably, an aluminum or aluminum alloy bond promoting layer is formed on the interface surface of the beryllium member prior to HIP bonding. This layer also serves as a stress relaxation layer.

The alloy insert body can be used in bulk form, or presented as an aluminum or aluminum alloy core material having aluminum-magnesium or aluminum-silicon-magnesium alloy surface layers formed thereon.

Another aspect of the present invention resides in a method of producing a HIP-bonded body comprised of a beryllium member and a copper alloy member comprising the steps of: forming a diffusion inhibiting layer of titanium, vanadium, niobium, chromium, molybdenum or silicon on one side of a copper alloy member; juxtaposing an aluminum-magnesium or aluminum-silicon-magnesium alloy insert body between the beryllium member and the coated copper alloy member; subjecting the beryllium member—insert body— copper alloy member to HIP bonding to bond the beryllium member to the copper alloy member with the diffusion inhibiting layer and alloy insert body situated between the two members.

Preferably, the method of the present invention further comprises a step of forming an aluminum or aluminum alloy bond promoting layer on the outer surface of the diffusion inhibiting layer. It also preferred to form a copper or copper alloy bond promoting layer on the surface of the copper alloy member prior to depositing the diffusion inhibiting layer thereon.

Preferably an aluminum or aluminum alloy bond promoting layer is also formed on the beryllium member prior to HIP-bonding with the alloy insert body. This layer also serves as a stress relaxation layer.

The method of the present invention overcomes the drawbacks associated with the prior art by forming the necessary layers on the beryllium and copper alloy members before the HIP-bonding is performed. The layers formed on the copper alloy member can be formed by physical vapor deposition, thermal spraying, or the like, to achieve good bonding strength between the respective layers and the copper alloy member. The same applies with the bond promoting layer formed on the beryllium member. The aluminum-magnesium or aluminum-silicon-magnesium alloy insert body easily bonds to the beryllium member (either directly or through the interposed bond promoting layer) and the diffusion inhibiting layer (either directly or through the interposed bond promoting layer), since the aluminum contained in the insert body easily bonds with the adjacent member and/or layers during the HIP-bonding process, even at temperatures lower than the melting point temperatures of all the members and coated layers involved.

In the case where aluminum or aluminum alloy bond promoting layers are formed on the beryllium member and the diffusion inhibiting layer, the HIP-bonding step is highly successful even if those aluminum or aluminum alloy layers oxidize prior to HIP-bonding. The inventor discovered that the magnesium in the insert body effectively removes the oxygen from the oxidized surfaces of the aluminum or aluminum alloy layers, to thereby allow the aluminum from the insert body to bond directly with the aluminum from the bond promoting layers.

BRIEF DESCRIPTION OF THE DRAWINGS

FIG. 1 shows a HIP-bonding process according to the prior art.

DETAILED DESCRIPTION OF THE INVENTION

Figure 2A:
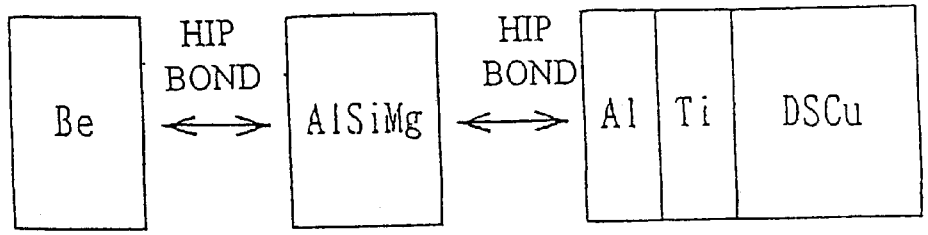
FIGS. 2(a)–2(d) show HIP-bonding processes in accordance with various embodiments of the present invention.

With reference to FIG. 2(a), the present invention produces strong beryllium-copper alloy bonds by utilizing a diffusion inhibiting layer (e.g., Ti), a bond promoting layer (e.g., Al) and an Al—Mg or Al—Si—Mg alloy insert body to enhance the activity of the beryllium and copper surfaces to improve bonding strength. Prior to subjecting the beryllium and copper alloy members to HIP bonding, the diffusion inhibiting layer is deposited directly on the copper alloy member (DSCu). This diffusion inhibiting layer can be composed of titanium, vanadium, niobium, chromium, molybdenum or silicon, however; titanium is preferred. The diffusion inhibiting layer is formed on the surface of the copper alloy by physical vapor deposition (PVD), thermal spraying or the like. It is recommended that the diffusion inhibiting layer have a thickness of 0.5 $\mu$m to 200 $\mu$m. It has been discovered that a diffusion inhibiting layer of less that 0.5 $\mu$m does not function adequately and that there is no benefit from thicknesses in excess of 200 $\mu$m. The purpose of the diffusion inhibiting layer is to suppress the formation of brittle intermetallic beryllium-copper intermediates such as $Be_2Cu$ or BeCu, by preventing Be from the beryllium member and Cu from the copper alloy member from combining directly.

The Al or Al alloy bond promoting layer is then applied to the outer surface of the diffusion inhibiting layer by physical vapor deposition, thermal spraying, or the like. It has been determined that vacuum deposition. sputtering and ion plating are the preferred PVD methods of depositing the aluminum layer onto the diffusion inhibiting layer while vacuum plasma spraying (VPS), low pressure inert atmosphere plasma spraying (LPPS), wire thermal spraying conducted in air or an inert atmosphere, as well as explosion spraying methods such as detonation gun (D-Gun), jet coat and HVOF (high velocity oxygen free), are the most suitable thermal spraying methods. Optimally, the thickness of the aluminum or aluminum alloy bond promoting layer should be between 0.5 $\mu$m to 200 $\mu$m. A thickness below this range is ineffective while a thickness above this range is not cost effective.

It has been discovered that immediately after forming the aluminum or aluminum alloy bond promoting layer on the diffusion inhibiting layer, the aluminum begins to oxidize producing an undesirable aluminum oxide ($Al_2O_3$) film that becomes a barrier compromising the strength of the bond. It is impossible to remove the $Al_2O_3$ film before HIP-bonding, as it will reform very quickly. To alleviate the adverse effect of the oxidized film, an alloy insert body composed of a soft aluminum alloy containing magnesium, or preferably, magnesium and silicon in combination, is juxtaposed between the beryllium member and the copper alloy member, prepared with at least the diffusion inhibiting layer as detailed previously, during the HIP-bonding process. It is preferable to use an aluminum alloy containing less that 3% by weight magnesium. The insert body prevents the formation of aluminum oxide compounds because magnesium is a strong reducing agent capable of removing oxygen from the $Al_2O_3$ film on the surface of the aluminum or aluminum alloy bond promoting layer. The scavenging effects of the magnesium leave pure aluminum behind to bind with the aluminum contained in the insert alloy. This in turn provides for direct bonding between the aluminum in the insert body and the aluminum in the bond promoting layer formed on the diffusion inhibiting layer. The alloy insert body should have a thickness of approximately 0.02 mm to 5.0 mm.

Figure 2B:
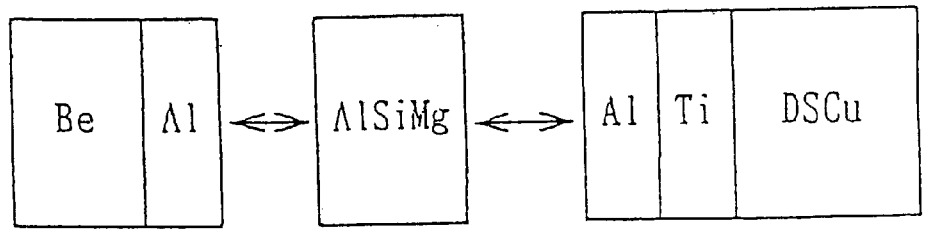

The HIP-bonding process shown in FIG. 2(b) is similar to that shown in FIG. 2(a) except that a bond promoting layer of aluminum or aluminum alloy is formed on the surface of the beryllium member by chemical vapor deposition, thermal spraying, or the like, before the HIP-bonding process is initiated. The thickness of the aluminum layer or aluminum alloy deposited on the beryllium member should be within a range of 0.02 mm to 5.0 mm. Thicknesses outside this range have been determined to be ineffective and can act undesirably as a stress relief layer.

The magnesium component in the alloy insert body functions the same way with respect to any oxidized layer that may form on the outer surface of this aluminum or aluminum alloy bond promoting layer. As a result, the aluminum from the alloy insert body can bond directly with the aluminum from the bond promoting layer formed on the surface of the beryllium member.

Figure 2C:
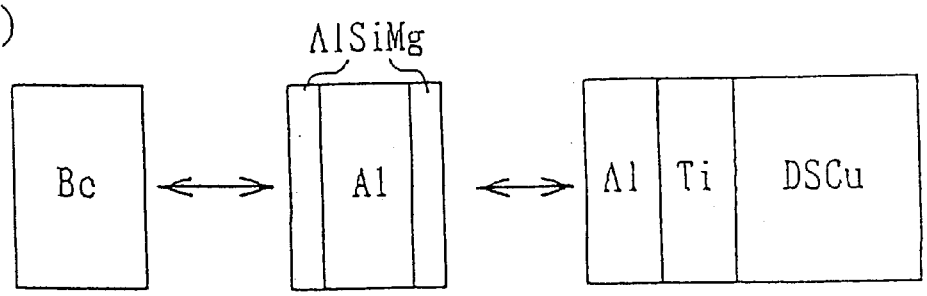
Figure 2D:
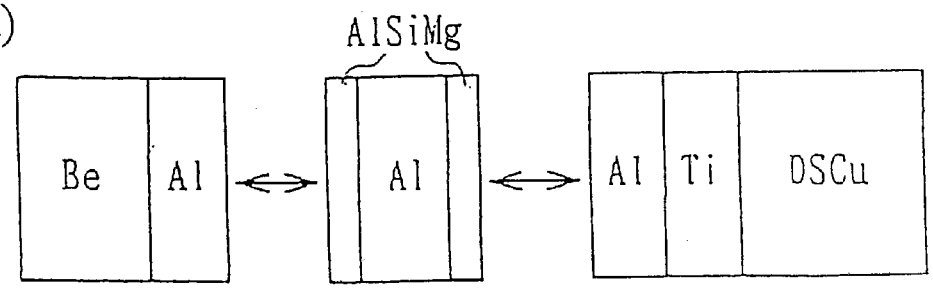

An insert body composed of an inner core of pure aluminum with cladding made from an aluminum-magnesium alloy or aluminum-silicon-magnesium alloy (FIGS. 2(c)–2(d)) has proven most successful at preventing oxide formation while promoting bond formation. The inner core of aluminum functions effectively as a stress relief layer. The beryllium-aluminum or aluminum-aluminum interface is highly desirable because these types of interfaces are soft, have low melting points, and facilitate diffusion. As a result, strong HIP bonds are formed even at temperatures below 600° C.

The bonding temperature of the present invention must be less than the melting point temperature of the materials of the insert body. The reason for this requirement is that at temperatures above the insert body melting point, solutes contained in the bonding materials aggregate during the solidification phase of the bonding process and coarse compounds form which degrade the integrity of the HIP bond. These coarse compounds can fracture the bond when the bond is subjected to thermal cycling. If the preferred insert is used, the HIP bonding temperature should preferably be in a range from 500° C. to 559° C.

FIGS. 3(a)–3(d) show HIP-bonding processes similar to FIGS. 2(a)–2(d) except a bond promoting layer comprising pure copper or soft copper alloy is formed on the copper alloy member by physical vapor deposition, thermal spraying, or the like. It has been discovered that this layer promotes the formation of a stronger bond with the diffusion inhibiting layer due to its affinity with the copper alloy to which it is bonded. The copper or copper alloy layer also serves to effectively reduce the stress caused by the difference in coefficient of thermal expansion between the beryllium member and the copper alloy member. This in turn prevents separation at the interface between the copper alloy member and the diffusion inhibiting layer.

Preferably the copper or copper alloy layer has a thickness which is approximately 1.0 μm to 5.0 mm. It has been found that a thickness less than 1.0 μm renders this copper layer ineffective. A copper bond promoting layer with a thickness greater than 5.0 mm reaches saturation as a bond facilitator and is not cost effective.

Figure 3A:
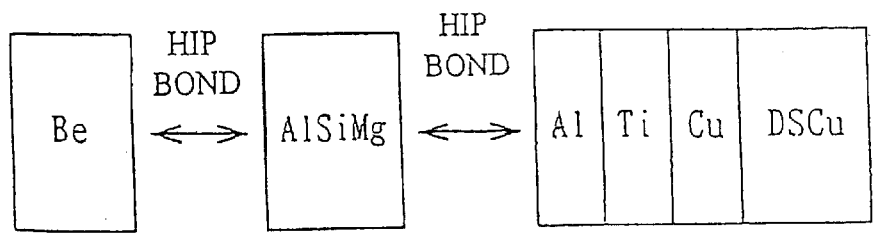
FIGS. 3(a)–3(d) are similar to FIGS. 2(a)–2(d), except a copper bond promoting layer is interposed between the Ti diffusion inhibiting layer and the copper alloy member.
Figure 3B:
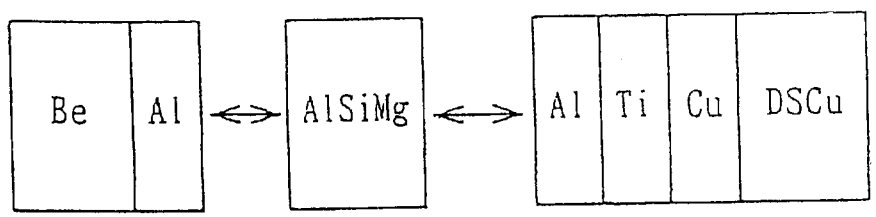
Figure 3C:
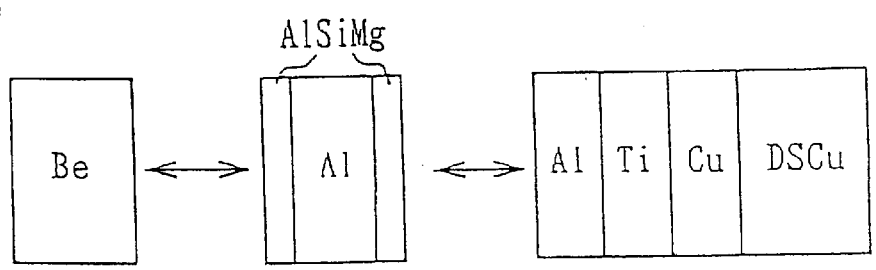
Figure 3D:
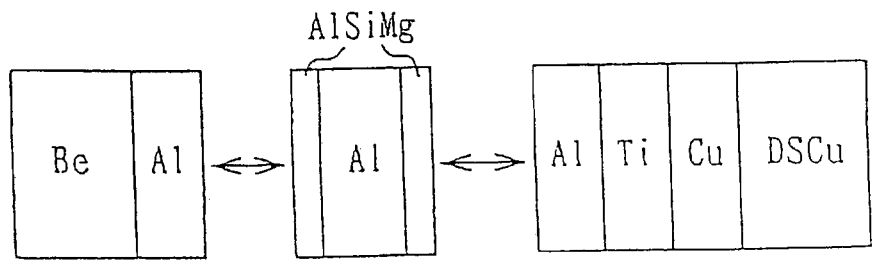

In the most preferred embodiment shown in FIGS. 3(b) and 3(d), before beginning the HIP bonding process, the beryllium member is prepared with an outer layer of bond facilitating aluminum or aluminum alloy deposited on its surface, as in FIGS. 2(b) and (d). Also before beginning the HIP process, a bond promoting layer of pure copper or soft copper alloy is deposited on the copper alloy member, a diffusion inhibiting layer of titanium is formed on the bond promoting layer, and on the exposed surface of the titanium layer, a bond promoting layer of aluminum or aluminum alloy is applied. The beryllium member and the copper alloy member after undergoing the surface processing as described, are then subjected to the HIP bonding process with the outermost coated layer of each member abutting the alloy insert body described above. The aluminum contained in the alloy insert body bonds with the layer of aluminum formed on the beryllium member and the outer layer of aluminum formed on the copper alloy member. This results in an extremely strong and durable bond.

The HIP process is conducted at temperatures between 500° C. to 559° C. to promote complete diffusion, but to prevent melting of the insert material.

Copper alloys particularly suitable For carrying out the present invention include alumina dispersion-strengthened copper (DSCu), chromium-zirconium copper and beryllium copper (e.g., C17510, C17500). Al—Mg alloys suitable for the insert body include JIS 5005, JIS 5052, and the like. Al—Si—Mg alloys suitable for the insert body include brazing materials such as BA4003, BA4004, BA4005, BA4N04, or cladding materials of BA3PC, BA4PC, BA7PC, BA8PC, BA9PC, BA10PC, BA17PC, BA18PC wherein the brazing sheets or core materials thereof are replaced with aluminum, JIS 1050, JIS 1100, or the like.

EXAMPLES

Beryllium and each type of the aforementioned preferred copper alloys were used as test specimens (length=25 mm, width=25 mm, thickness=15 mm). After each type of intermediate layer was formed in compliance with the detailed description of the invention and Table 1, the beryllium-copper alloy sample was placed in a 1.5 mm stainless steel (SUS304)vacuum vessel, which was deaerated and weld seal processed. HIP bonding was then performed pursuant to the conditions stated in Table 1.

After completing the HIP bonding, a 4 mm square sample was removed by electric discharge machining primarily from the beryllium-copper alloy interface so as insure the procurement of a sample containing the HIP bond. The sample was polished and the four point flexural strength of the sample was measured.

A repeated thermal cycle test was then performed. The procured sample was subjected to temperatures as high as 350° C. and as low as −196° C. (the temperature of liquid nitrogen). The purpose of this experiment was to determine the sample's resistance to heat cycling. The sample was repeatedly exposed to varying temperatures until the bond began to delaminate. The results of this experiment are presented in Table 1.

As demonstrated in Table 1, the HIP bonds achieved by the present method exhibited strengths in excess of 200 MPa and a bond reliability factor in excess of 4000 thermal cycles before fracturing was observed. It can be concluded that the present invention results in stronger beryllium-copper alloy HIP bonds, even at HIP bonding temperatures below 600° C.

Although certain preferred embodiments have been described, it is understood that the invention is not limited thereto and modifications and variations would be evident to a person of ordinary skill in the art.

| No. | Beryllium surface film forming method | Insert material | Copper alloy surface film forming method | HIP conditions Temperature × time (° C. × h) | Pressure applied (Mpa) | Shear strength (Mpa) | Number of thermal cycles until fracture (times) | Remarks |
|---|---|---|---|---|---|---|---|---|
| 1 | Be(Al (200 μm thermal spraying) | BA4004 (0.2 mm) | Al (20 μm vapor deposition)/ Ti (20 μm vapor deposition)/DSCu | 555 × 1 | 120 | 245 | 5000 (without peeling) | inventive example |
| 2 | Be/Al (20 μm ion plating) | Film material: BA4004 Core material: A1050 (1.2 mm) | Al (20 μm ion plating)/ V (10 μm ion plating)/CuCrZr | 557 × 2 | 140 | 238 | 5000 (without peeling) | " |
| 3 | Be/Al (10 μm ion plating) | BA4PC (1.0 mm) | Al (200 μm plating)/ CT (200 μm plating)/DSCu | 550 × 2 | 250 | 210 | 4600 | " |
| 4 | Be/Al (400 μm thermal spraying) | A5005 (0.10 mm) | Al (20 μm ion plating)/ Nb (5 μm ion plating)/CuCrZr | 559 × 1 | 100 | 215 | 4300 | " |
| 5 | Be/Al (400 μm thermal spraying) | BA4004 (0.12 mm) | Al (10 μm sputtering)/ Mo (5 μm sputtering)/CuN | 557 × 2 | 80 | 240 | 5000 (without peeling) | " |
| 6 | Be (no surface film) | Film material: BA4004 Core material: Al100 (1.5 mm) | Al (20 μm vapor deposition)/ Ti (20 μm vapor deposition)/DSCu | 555 × 2 | 120 | 238 | 5000 (without peeling) | " |
| 7 | Be/Al (700 μm thermal spraying) | BA4004 (0.12 mm) | Al (10 μm ion plating)/ Ti (15 μm ion plating)/ Cu (8 μm ion plating)/DSCu | 555 × 2 | 150 | 260 | 5000 (without peeling) | " |
| 8 | Be (no surface film) | Film material: BA4004 Core material:) Al100 (1.5 mm | Ti (10 μm ion plating)/ Cu (1 mm cladding)/DSCU | 500 × 2 | 150 | 240 | 5000 (without peeling) | " |
| 9 | Be/Al (800 μm thermal spraying)/Ti (50 μm thermal spraying)/Cu (100 μm thermal spraying) | None | None | 550 × 2 | 150 | 120 | 3200 | comparative example |
| 10 | Be/Al (20 μm vapor deposition)/Mo (10 μm vapor deposition)/Cu (100 μm vapor deposition) | None | None | 580 × 4 | 140 | 105 | 2800 | comparative example |
| 11 | Be/Al (20 μm ion plating) | BA4343 (1.2 mm) (not containing Mg) | Al (20 μm vapor deposition)/ Ti (20 μm vapor deposition)/DSCu | 555 × 1 | 120 | 70 | 510 | comparative example |

What is claimed is:

1. A method of producing a HIP-bonded beryllium-copper alloy body, comprising the steps of:
    coating a diffusion inhibiting layer on a surface of a copper alloy member, said diffusion inhibiting layer comprising a metal selected from the group consisting of titanium, vanadium, niobium, chromium, molybdenum and silicon;
    abutting the coated copper alloy member with a beryllium member through an interposed alloy insert body comprising aluminum-magnesium alloy; and
    hot isostatic pressing the beryllium member, copper alloy member and alloy insert body to bond the beryllium member to the copper alloy member through the alloy insert body.

2. The method of claim 1, wherein said alloy insert body comprises aluminum-silicon-magnesium alloy.

3. The method of claim 1, further comprising the step of forming an aluminum or aluminum alloy bond promoting layer on the exposed surface of the diffusion inhibiting layer prior to the abutting step.

4. The method of claim 1, wherein the diffusion inhibiting layer has a thickness ranging from about 0.5 μm to about 200 μm.

5. The method of claim 3, wherein the aluminum or aluminum alloy bond promoting layer has a thickness of approximately 0.5 μm to about 200 μm.

6. The method of claim 1, wherein the alloy insert body contains less than 3% by weight magnesium.

7. The method of claim 2, wherein the alloy insert body contains less than 3% by weight magnesium.

8. The method of claim 3, wherein the diffusion inhibiting layer and the aluminum or aluminum alloy bond promoting layer are formed by physical vapor deposition or thermal spraying.

9. The method of claim 1, wherein the copper alloy member comprises one of alumina dispersion-strengthened copper, chrome-zirconium copper, or beryllium copper.

10. The method of claim 3, further comprising the step of forming an aluminum or aluminum alloy bond promoting layer on the exposed surface of the beryllium member prior to the abutting step.

11. The method of claim 10, wherein the aluminum or aluminum alloy bond promoting layer has a thickness ranging from about 0.02 mm to about 5.0 mm.

12. The method of claim 10, wherein the aluminum or aluminum alloy bond promoting layer is formed on the beryllium member by physical vapor deposition or thermal spraying.

13. The method of claim 1, further comprising the step of forming a copper or copper alloy bond promoting layer on the surface of the copper alloy member before forming the diffusion inhibiting layer.

14. The method of claim 13, wherein the copper or copper alloy bond promoting layer has a thickness ranging from about 1.0 µm to 5.0 mm.

15. The method of claim 13, wherein the copper or copper alloy bond promoting layer is formed on the copper alloy member by physical vapor deposition or thermal spraying.

16. The method of claim 10, further comprising the step of forming a copper or copper alloy bond promoting layer on the surface of the copper alloy member before forming the diffusion inhibiting layer.

17. The method of claim 16, wherein the copper or copper alloy bond promoting layer has a thickness ranging from about 1.0 µm to 5.0 mm.

18. The method of claim 16, wherein the copper or copper alloy bond promoting layer is formed on the copper alloy member by physical vapor deposition or thermal spraying.

19. The method of claim 1, wherein the alloy insert body comprises an aluminum or aluminum alloy core with layers of aluminum-magnesium alloy clad on opposite surfaces thereof.

20. The method of claim 1, wherein the aluminum-magnesium alloy insert has a thickness ranging from about 0.02 mm to 5.0 mm.

21. The method of claim 1, wherein the hot isostatic pressing is performed at a temperature ranging from 500° C. to 559° C.

22. A HIP-bonded beryllium-copper alloy body comprising:
  a copper alloy member;
  a diffusion inhibiting layer formed on a surface of said copper alloy member, said diffusion inhibiting layer comprising a metal selected from the group consisting of titanium, vanadium, niobium, chromium, molybdenum and silicon;
  an alloy insert body comprising aluminum-magnesium alloy, one side of said alloy insert body being HIP-bonded to said copper alloy member via said diffusion inhibiting layer; and
  a beryllium member HIP-bonded to the other side of said alloy insert body.

23. The body of claim 22, wherein said alloy insert body comprises aluminum-silicon-magnesium alloy.

24. The body of claim 22, wherein said diffusion inhibiting layer has a thickness ranging from about 0.5 µm to about 200 µm.

25. The body of claim 22, further comprising an aluminum or aluminum alloy bond promoting layer between said alloy insert body and said diffusion inhibiting layer.

26. The body of claim 25, wherein said aluminum or aluminum alloy bond promoting layer has a thickness ranging from about 0.5 µm to about 200 µm.

27. The body of claim 22, wherein the alloy insert body contains less than 3% by weight magnesium.

28. The body of claim 23, wherein the alloy insert body contains less than 3% by weight magnesium.

29. The body of claim 22, wherein said copper alloy member comprises one of alumina dispersion-strengthened copper, chrome-zirconium copper, or beryllium copper.

30. The body of claim 25, further comprising an aluminum or aluminum alloy bond promoting layer between said alloy insert body and said beryllium member.

31. The body of claim 30, wherein said aluminum or aluminum alloy bond promoting layer has a thickness ranging from about 0.02 mm to about 5.0 mm.

32. The body of claim 25, further comprising a copper or copper alloy bond promoting layer between said copper alloy member and said diffusion inhibiting layer.

33. The body of claim 32, wherein said copper or copper alloy bond promoting layer has a thickness ranging from about 1.0 µm to 5.0 mm.

34. The body of claim 30, further comprising a copper or copper alloy bond promoting layer between said copper alloy member and said diffusion inhibiting layer.

35. The body of claim 34, wherein said copper or copper alloy bond promoting layer has a thickness ranging from about 1.0 µm to 5.0 mm.

36. The body of claim 22, wherein said alloy insert body comprises an aluminum or aluminum alloy core with layers of aluminum-magnesium alloy clad on opposite surfaces thereof.

37. The body of claim 22, wherein said aluminum-magnesium alloy insert has a thickness ranging from about 0.02 mm to 5.0 mm.

* * * * *

UNITED STATES PATENT AND TRADEMARK OFFICE
CERTIFICATE OF CORRECTION

PATENT NO.      : 6,286,750 B1
DATED           : September 11, 2001
INVENTOR(S)     : Takaharu Iwadachi It is certified that error appears in the above-identified patent and that said Letters Patent is hereby corrected as shown below:

<u>Title page,</u>
Item [30], Foreign Priority Data, replace "Mar. 23, 1999 (JP)...... 11-077657" with -- Mar. 23, 1999(JP)..11-077657 & Dec. 8, 1999(JP)..11-348471 --.

Signed and Sealed this

Twelfth Day of March, 2002

Attest:

Attesting Officer

JAMES E. ROGAN
*Director of the United States Patent and Trademark Office*